(12) United States Patent
Rivera

(10) Patent No.: US 10,258,186 B2
(45) Date of Patent: *Apr. 16, 2019

(54) BREWING CARTRIDGE

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 1022 days.

This patent is subject to a terminal disclaimer.

(21) Appl. No.: 14/531,729

(22) Filed: Nov. 3, 2014

(65) Prior Publication Data

US 2015/0056331 A1 Feb. 26, 2015

Related U.S. Application Data

(63) Continuation-in-part of application No. 13/757,026, filed on Feb. 1, 2013, now Pat. No. 8,967,038.

(60) Provisional application No. 61/898,886, filed on Nov. 1, 2013.

(51) Int. Cl.
| | | |
|---|---|---|
| *A47J 31/02* | (2006.01) | |
| *B65D 85/804* | (2006.01) | |
| *A47J 31/06* | (2006.01) | |

(52) U.S. Cl.
CPC ............ *A47J 31/02* (2013.01); *A47J 31/0689* (2013.01); *B65D 85/8043* (2013.01); *B65D 2565/385* (2013.01); *Y02W 30/807* (2015.05)

(58) Field of Classification Search
CPC . B65D 85/8043; A47J 31/0673; A47J 31/407; A47J 31/0689
USPC .............................. 99/295, 323, 302 R, 302 P
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenbert et al. |
| 3,384,004 A | 5/1968 | Perlman et al. |
| 3,405,630 A | 10/1968 | Weber, III |
| 3,583,308 A | 6/1971 | Williams |

(Continued)

FOREIGN PATENT DOCUMENTS

WO WO 2005/092160 A1 10/2005

*Primary Examiner* — Dana Ross
*Assistant Examiner* — Lawrence Samuels
(74) *Attorney, Agent, or Firm* — IP Strategies

(57) ABSTRACT

A single serving brewing cartridge adapter fits into known single serving horizontal coffee makers and allows use of a common single serving cartridge made for a vertical coffee maker. The cartridge adapter includes a fixed extraction needle in the base of cartridge adapter and defines walls rising from the base to guide a cartridge into position. The extraction needle pierces a single use cartridge to release brewed beverage into the cartridge adapter. An injection needle in the horizontal coffee maker lid punctures a foil cover of single use cartridges and passes through a permanent opening in a lid of the cartridge adapter and an extraction needle in the horizontal coffee maker cooperates with the cartridge adapter to carry brewed drink from the cartridge adapter. Reusable cartridges including permanent openings to receive the injection needle and to release brewed beverage may also be used with the cartridge adapter.

19 Claims, 10 Drawing Sheets

(56) References Cited

U.S. PATENT DOCUMENTS

| | | | |
|---|---|---|---|
| 3,607,297 A | 9/1971 | Fasano | |
| 3,757,670 A | 9/1973 | Laama et al. | |
| 3,844,206 A | 10/1974 | Weber | |
| 3,958,502 A | 5/1976 | Vitous | |
| 4,253,385 A | 3/1981 | Illy | |
| 4,286,515 A | 9/1981 | Baumann et al. | |
| 4,603,621 A | 8/1986 | Roberts | |
| 4,703,687 A | 11/1987 | Wei | |
| 4,800,089 A | 1/1989 | Scott | |
| 4,998,463 A | 3/1991 | Precht et al. | |
| 5,000,082 A | 3/1991 | Lassota | |
| 5,012,629 A | 5/1991 | Rehman | |
| 5,04,6409 A | 9/1991 | Henn | |
| 5,123,335 A | 6/1992 | Aselu | |
| 5,171,457 A | 12/1992 | Acuff et al. | |
| 5,233,914 A | 8/1993 | English | |
| 5,325,765 A | 7/1994 | Sylvan et al. | |
| 5,335,589 A | 8/1994 | Yerves et al. | |
| 5,526,733 A | 6/1996 | Klawuhn et al. | |
| 5,582,730 A | 12/1996 | Hugentobler | |
| 5,649,412 A | 7/1997 | Binacchi | |
| 5,636,563 A | 9/1997 | Oppermann et al. | |
| 5,676,041 A | 10/1997 | Glucksman et al. | |
| 5,829,340 A | 11/1998 | Yang | |
| 5,840,189 A | 11/1998 | Sylvan et al. | |
| 5,870,943 A | 2/1999 | Levi et al. | |
| 5,895,672 A | 4/1999 | Cooper | |
| 6,136,352 A | 10/2000 | Silverstein et al. | |
| 6,189,438 B1 | 2/2001 | Bielfeldt et al. | |
| D454,433 S | 3/2002 | Peter | |
| D454,434 S | 3/2002 | McDaniel et al. | |
| 6,440,256 B1 | 8/2002 | Gordon et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 * | 8/2003 | Lazaris | B65D 85/8043 206/0.5 |
| 6,645,537 B2 | 11/2003 | Sweeney et al. | |
| 6,655,260 B2 | 12/2003 | Lazaris et al. | |
| 6,658,989 B2 * | 12/2003 | Sweeney | A47J 31/0642 99/306 |
| 6,708,600 B2 | 3/2004 | Winkler et al. | |
| 6,727,484 B2 | 4/2004 | Policappelli | |
| 6,740,345 B2 | 5/2004 | Cai | |
| 6,777,007 B2 | 8/2004 | Cai | |
| 6,832,542 B2 | 12/2004 | Hu et al. | |
| 6,843,165 B2 | 1/2005 | Stoner et al. | |
| D502,362 S | 5/2005 | Lazaris et al. | |
| 6,904,840 B1 | 6/2005 | Pfeifer et al. | |
| 6,948,420 B2 | 9/2005 | Kirschner et al. | |
| 7,047,870 B2 | 5/2006 | Gantt et al. | |
| 7,081,263 B2 | 7/2006 | Albrecht | |
| 7,131,369 B2 | 11/2006 | Gantt et al. | |
| 7,320,274 B2 | 1/2008 | Casetllani | |
| 7,377,089 B2 | 5/2008 | Rapparini | |
| 7,946,217 B2 | 5/2011 | Favre et al. | |
| 8,047,126 B2 * | 11/2011 | Doglioni Majer | A47J 31/0642 426/433 |
| 8,047,127 B2 | 11/2011 | Lin | |
| 8,291,812 B2 * | 10/2012 | Rivera | A47J 31/057 100/211 |
| 8,967,038 B2 * | 3/2015 | Rivera | B65D 85/8043 99/295 |
| 9,486,108 B1 * | 11/2016 | Douglas | A47J 31/60 |
| 2002/0035929 A1 | 3/2002 | Kanba et al. | |
| 2002/0148356 A1 | 10/2002 | Lazaris et al. | |
| 2003/0200872 A1 | 10/2003 | Lin | |
| 2004/0005384 A1 | 1/2004 | Cai | |
| 2004/0118290 A1 | 6/2004 | Cai | |
| 2004/0163543 A1 * | 8/2004 | Hu | A47J 31/4496 99/275 |
| 2005/0166763 A1 * | 8/2005 | Scarchilli | B65D 85/8046 99/279 |
| 2005/0236323 A1 | 10/2005 | Oliver et al. | |
| 2005/0257695 A1 | 11/2005 | Dobranski et al. | |
| 2006/0159815 A1 | 7/2006 | Crook et al. | |
| 2006/0174769 A1 | 8/2006 | Favre et al. | |
| 2006/0196364 A1 | 9/2006 | Kirschner | |
| 2007/0259074 A1 | 11/2007 | Searchilli et al. | |
| 2009/0155422 A1 * | 6/2009 | Ozanne | A47J 31/0615 426/89 |
| 2009/0229471 A1 | 9/2009 | Lun et al. | |
| 2010/0083843 A1 | 4/2010 | Denisart et al. | |
| 2010/0288131 A1 * | 11/2010 | Kilber | B65D 85/8043 99/295 |
| 2010/0303964 A1 * | 12/2010 | Beaulieu | B65D 85/8043 426/77 |
| 2011/0151075 A1 * | 6/2011 | Peterson | A47J 31/002 426/238 |
| 2011/0209623 A1 | 9/2011 | Lueng et al. | |
| 2011/0274802 A1 | 11/2011 | Rivera | |
| 2012/0058226 A1 * | 3/2012 | Winkler | A47J 31/3695 426/79 |
| 2012/0207895 A1 | 8/2012 | Rivera | |
| 2012/0207896 A1 * | 8/2012 | Rivera | A47J 31/0689 426/433 |
| 2012/0276264 A1 | 11/2012 | Rivera | |
| 2012/0285330 A1 | 11/2012 | Demiglio et al. | |
| 2012/0285334 A1 | 11/2012 | Demiglio et al. | |
| 2012/0308688 A1 * | 12/2012 | Peterson | A47J 31/002 426/86 |
| 2014/0245895 A1 | 9/2014 | Demiglio et al. | |
| 2017/0174418 A1 * | 6/2017 | Cai | B65D 85/8043 |

* cited by examiner

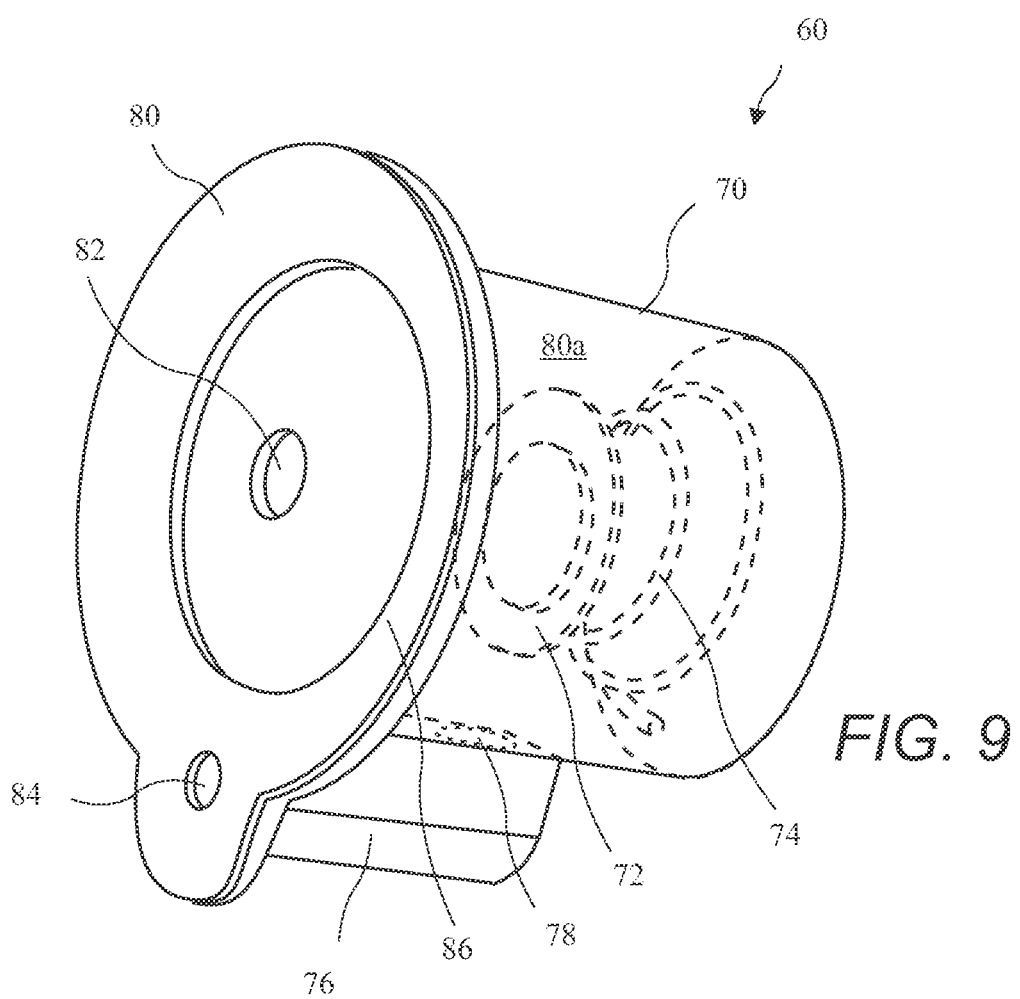

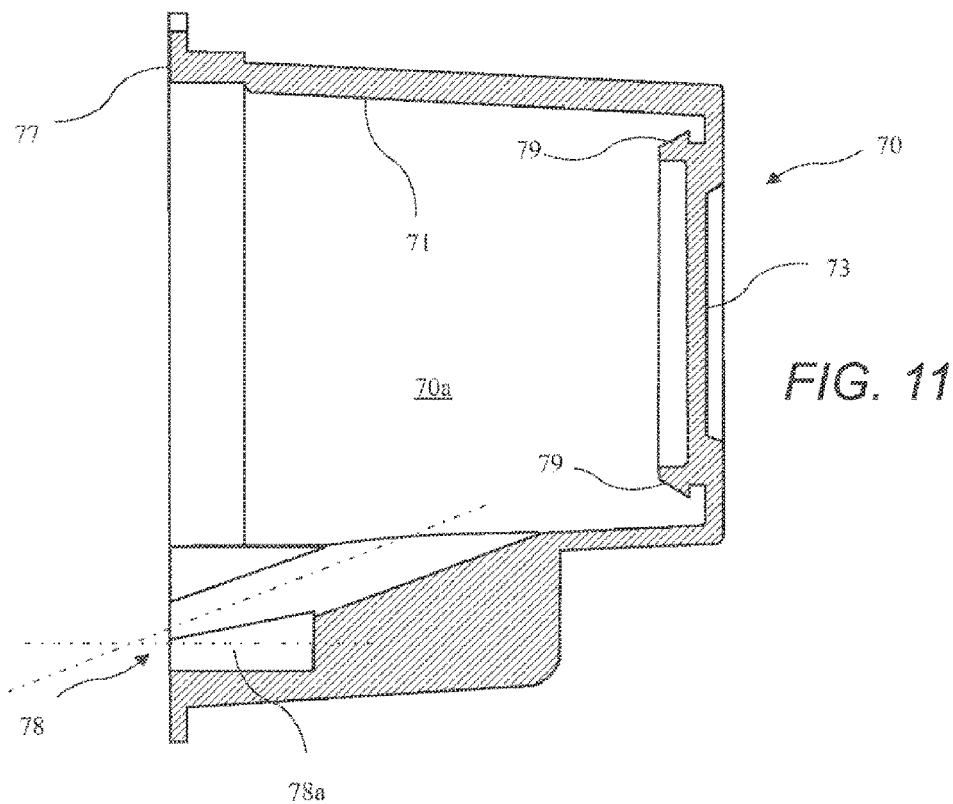
FIG. 11
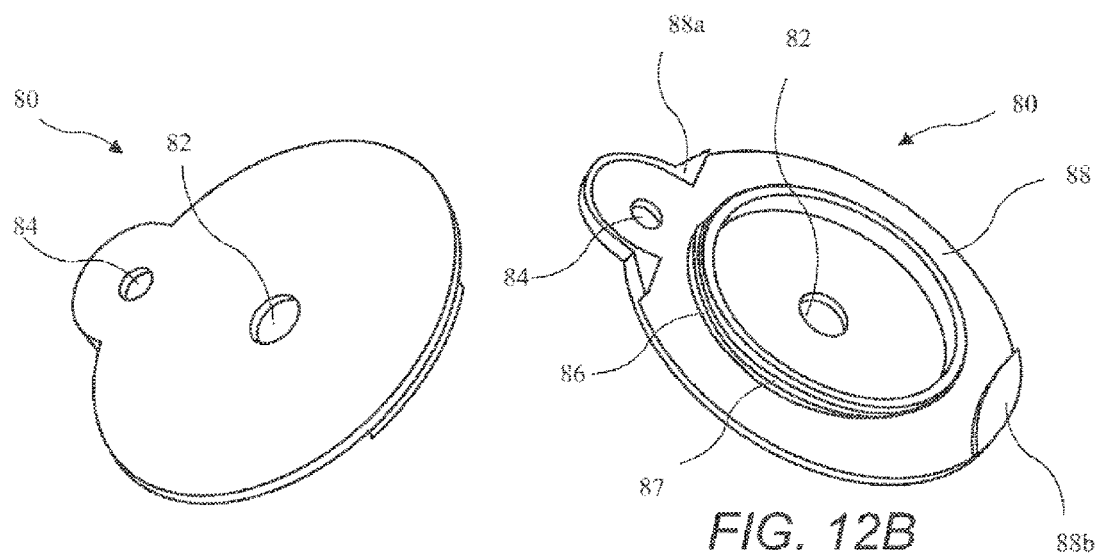
FIG. 12A
FIG. 12B

BREWING CARTRIDGE

CROSS-REFERENCE TO RELATED APPLICATIONS

The present application claims the priority of U.S. Provisional Patent Application Ser. No. 61/898,886 filed Nov. 1, 2013, and a Continuation In Part of U.S. patent application Ser. No. 13/757,026 filed Feb. 1, 2013, which applications are incorporated in their entirety herein by reference.

BACKGROUND OF THE INVENTION

The present invention relates to single serving brewing cartridges and in particular to an adapter allowing a brewing cartridge made for a popular single serving coffee maker to be used in a newer model single serving coffee maker.

Single serving coffee makers, using a disposable or a reusable cartridge, have become very popular. Such coffee makers are in wide use and a very large variety of brewing cartridges have become available for them. The disposable brewing cartridges are inserted into a brewing cavity of the coffee maker in a generally vertical orientation. An injection needle in the lid of the coffee maker punctures a foil cover on the disposable brewing cartridge to inject liquid into the disposable brewing cartridge and an extraction needle in the base of the brewing cavity punctures a base of the disposable brewing cartridges to release brewed beverage. An example of a popular single serving coffee maker is the coffee maker sold under the trademark KEURIG® which uses a single serving disposable brewing cartridge sold under the trademark K-CUP®.

Reusable cartridges have also been developed for the KEURIG® single serving coffee maker. The reusable cartridges include permanent openings in a lid of the reusable cartridge for the injection needle, and are designed to avoid the extraction needle. The sides and/or bottom of the reusable cartridge include passages allowing brewed drink to escape from the reusable cartridge into the brewing cavity of the coffee maker and then into a cup below the brewing chamber. The reusable cartridge thus alters the flow of brewed drink to avoid the extraction needle, but still works very well in the coffee maker.

A single serving horizontal coffee maker receives a somewhat larger generally horizontal brewing cartridge. The horizontal coffee maker includes parallel injection and extraction needles which both penetrate a foil cover of the horizontal brewing cartridge. Unfortunately, neither the single serving disposable brewing cartridge sold under the trademark K-CUP® nor the very common disposable cartridges made for the original single serving coffee makers can be used in the horizontal coffee makers, depriving the users of both cartridge selection and requiring the use of a more expensive disposable cartridge. An example of a single serving horizontal coffee maker is the coffee maker sold under the trademark VUE® which used disposable horizontal brewing cartridges sold under the trademark VUE®.

BRIEF SUMMARY OF THE INVENTION

The present invention addresses the above and other needs by providing a single serving brewing cartridge adapter which fits into known single serving horizontal coffee makers and allows use of a common single serving cartridge made for a vertical coffee maker. The cartridge adapter includes a fixed extraction needle in the base of cartridge adapter and defines walls rising from the base to guide a cartridge into position. The extraction needle pierces a single use cartridge to release brewed beverage into the cartridge adapter. An injection needle in the horizontal coffee maker lid punctures a foil cover of single use cartridges and passes through a permanent opening in a lid of the cartridge adapter and an extraction needle in the horizontal coffee maker cooperates with the cartridge adapter to carry brewed drink from the cartridge adapter. Reusable cartridges including permanent openings to receive the injection needle and to release brewed beverage may also be used with the cartridge adapter.

In accordance with one aspect of the invention, there is provided a brewing cartridge adapter configured to fit into a brewing chamber of a single serving horizontal coffee maker configured to accept known single use disposable brewing cartridges sold under the trademark VUE®, allowing the use of known single use disposable brewing cartridges sold under the trademark K-CUP® and of reusable adapters configured for use in coffee makers configured to accept the disposable brewing cartridges sold under the trademark K-CUP®. The brewing cartridge adapter includes an adapter extraction needle for penetrating disposable brewing cartridges to release brewed beverage. The adapter extraction needle is fixed in the base of the adapter and passage in the side of the adapter provides a path for the brewed beverage to flow to a coffee maker extraction needle.

In accordance with another aspect of the invention, there is provided a brewing cartridge adapter configured to fit into a brewing chamber of a single serving horizontal coffee maker configured to accept known single use disposable brewing cartridges sold under the trademark VUE®, allowing use of a single serving of packaged brewing material. The packaged brewing material may be pre-packaged or packaged by a user, The brewing cartridge adapter includes an offset passage on the side of the adapter housing to carry brewed beverage from the interior of the housing to the top of the housing where a coffee maker extraction needle cooperates with the housing to receive the brewed drink.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 9 shows a reusable coffee holder according to the present invention.

FIG. 11 shows a cross-sectional view of the holder base of the reusable coffee holder according to the present invention taken along line 11-11 of FIG. 10B.

FIG. 12A is a perspective top view of a holder lid for the reusable coffee holder according to the present invention.

FIG. 12B is a perspective bottom view of the holder lid for the reusable coffee holder according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
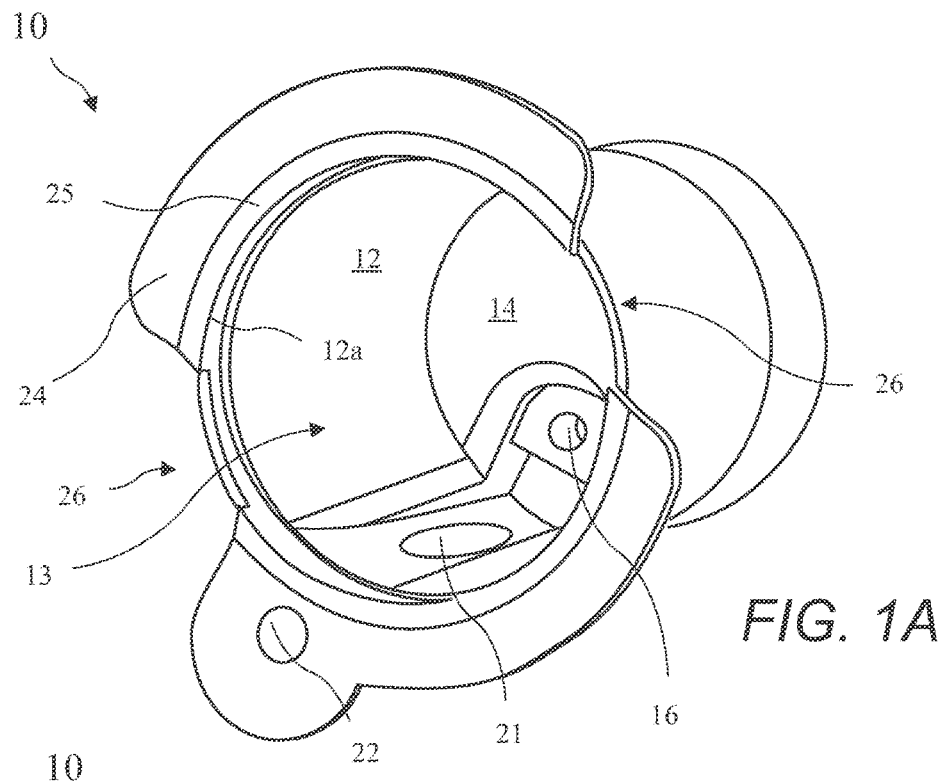
FIG. 1A shows a top perspective view of a brewing cartridge adapter according to the present invention before installation of an extraction needle.
Figure 1B:
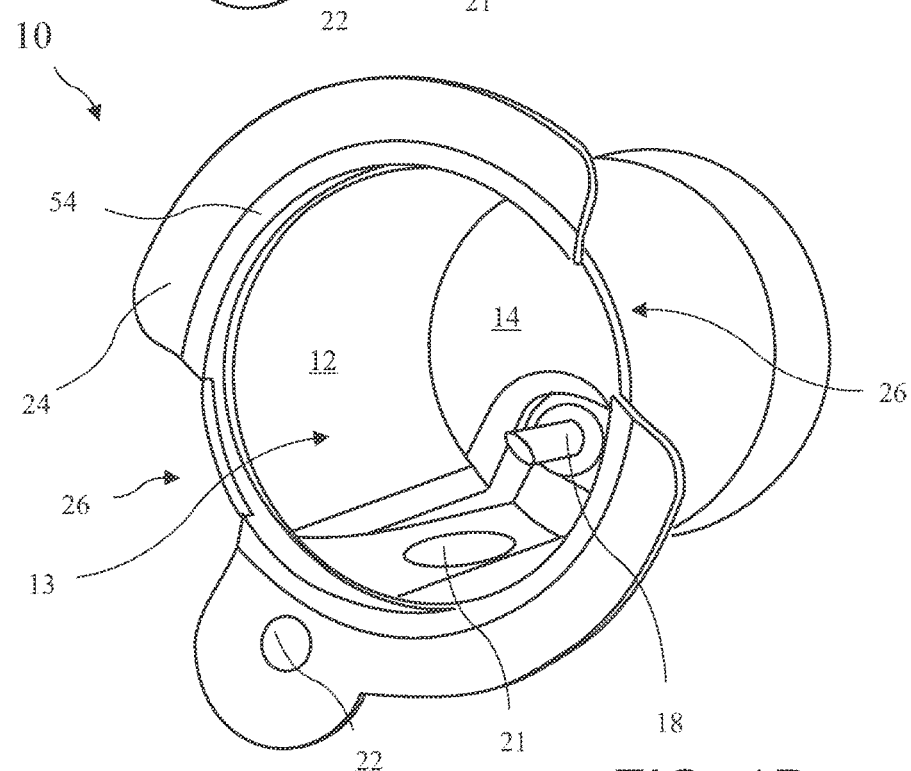
FIG. 1B shows a top perspective view of the brewing cartridge adapter according to the present invention after installation of the extraction needle.

A top perspective view of a reusable single serving brewing cartridge comprising a brewing cartridge adapter 10 according to the present invention, before installation of an adapter extraction needle 18, is shown in FIG. 1A, and a top perspective view of the brewing cartridge adapter 10 after installation of the extraction needle 18 is shown in FIG. 1B. The adapter extraction needle 18 is positioned off center in the floor 14 near the wall 12 of the brewing cartridge adapter 10 to avoid puncturing a filter in a disposable cartridge. The brewing cartridge adapter 10 is configured to fit into a brewing chamber of a single serving horizontal coffee maker configured to accept known single use disposable brewing cartridges sold under the trademark VUE® allowing the use of known single use disposable brewing cartridges sold under the trademark K-CUP® and of reusable adapters configured for use in coffee makers configured to accept the disposable brewing cartridges sold under the trademark K-CUP®. A single use disposable filter cartridge sold under the trademark K-CUP® has a top edge with a diameter of about 1.8 inches, a height of about 1¾ inches, and a frustoconical shape with a base smaller than the top edge. The base of the K-CUP cartridge is generally being about 1.45 inches in diameter.

The floor 14, and walls 12 reaching up from the floor 14, define an interior 13. An extraction needle cavity 16 is in the base 14 allows attachment of the adapter extraction needle 18. A passage 20 (see FIG. 3) enters the interior 13 through an entry port 21 and ends at an outlet port 22. The outlet port 22 cooperates with an existing coffee maker extraction needle 56 (see FIG. 15) to carry brewed drink from the cartridge adapter 10 into the coffee maker configured to accept known single use disposable brewing cartridges sold under the trademark VUE®. The brewing cartridge adapter 10 includes a partial rim 24 for seating in the coffee maker configured to accept known single use disposable brewing cartridges sold under the trademark VUE®. The brewing cartridge adapter 10 further includes a shelf 25 at a top edge of the walls 12 for seating brewing cartridges 40 (see FIGS. 8A and 8B), and notches 26 to facilitate removal of the brewing cartridges 40 after making a serving of brewed drink. The brewing cartridges 40 may be a disposable brewing cartridge sold under the trademark K-CUP®, or a reusable adapter configured for use in coffee makers configured to accept the disposable brewing cartridges sold under the trademark K-CUP®.

Figure 2:
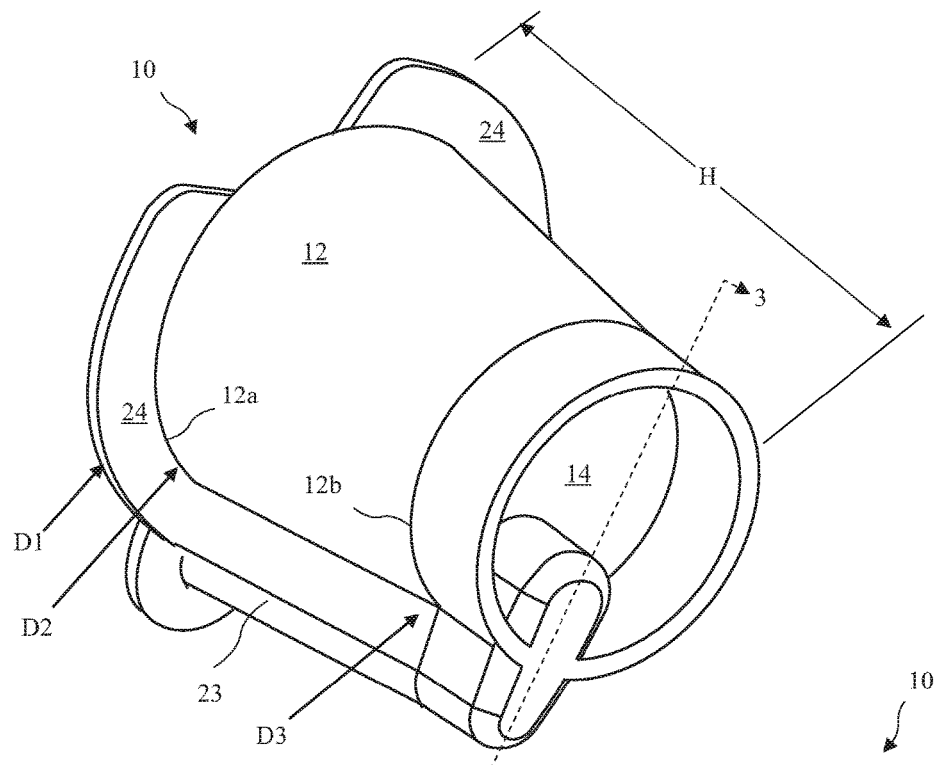
FIG. 2 shows a bottom perspective view of the brewing cartridge adapter according to the present invention.
Figure 3:
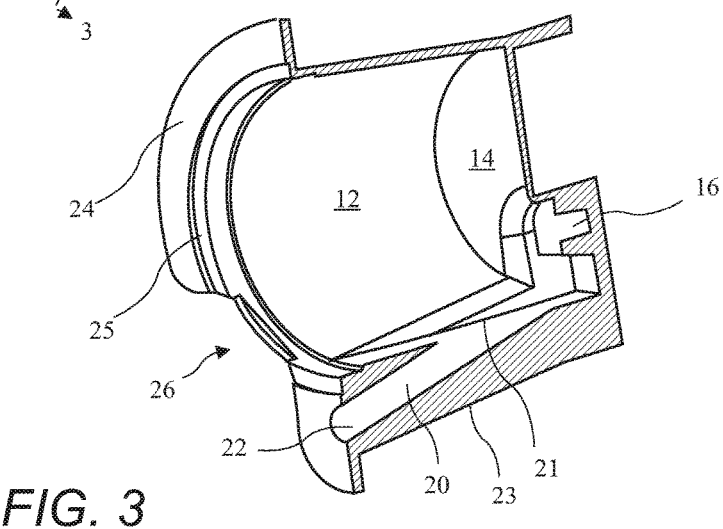
FIG. 3 shows a cross-sectional view of the brewing cartridge adapter according to the present invention taken along line 3-3 of FIG. 2.

A bottom perspective view of the brewing cartridge adapter 10 is shown in FIG. 2 and a cross-sectional view of the brewing cartridge adapter 10 taken along line 3-3 of FIG. 2 is shown in FIG. 3. The brewing cartridge adapter 10 has an overall height H of preferably about 2.4 inches high, a rim 24 diameter D1 of about 2.5 inches. A wall top 12a has an outside diameter D2 of preferably about 1.85 inches, and the base of the walls 12b has an outside diameter D3 of about 1.55 inches. The brewing cartridge 40 (see FIGS. 8A and 8B) may rest on the shelf 25 to position the disposable brewing cartridge 40 in the brewing cartridge adapter 10.

Figure 4:
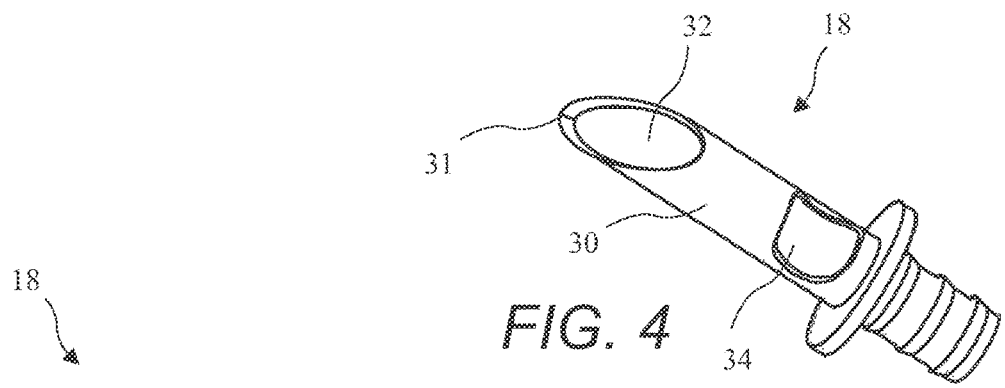
FIG. 4 is a perspective view of an extraction needle according to the present invention.
Figure 5:
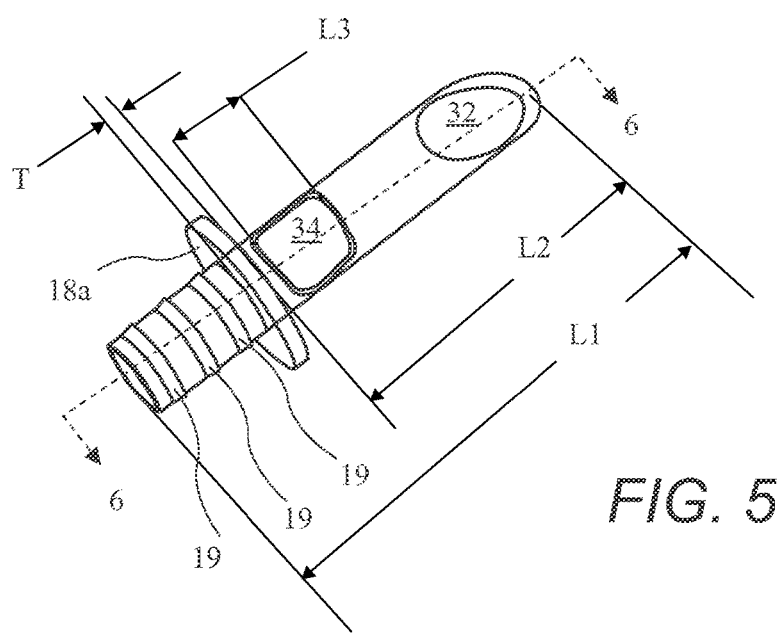
FIG. 5 is a second perspective view of the extraction needle according to the present invention.
Figure 6:
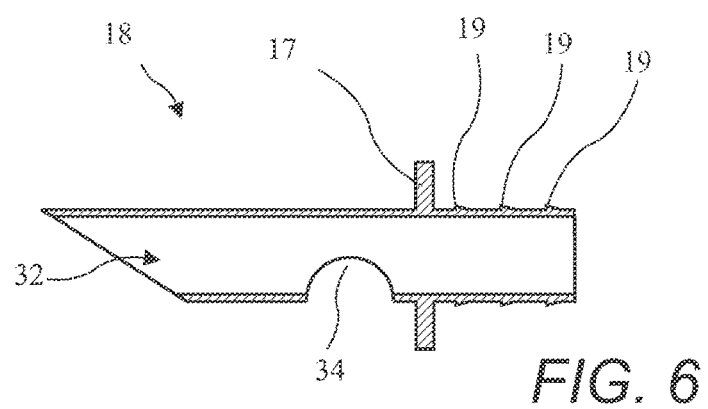
FIG. 6 is a cross-sectional view of the extraction needle according to the present invention taken along line 6-6 of FIG. 5.

A perspective view of the adapter extraction needle 18 is shown in FIG. 4, a second perspective view of the adapter extraction needle 18 is shown in FIG. 5, and a cross-sectional view of the adapter extraction needle 18 taken along line 6-6 of FIG. 5 is shown in FIG. 6. The adapter extraction needle 18 may be a press fit into the extraction needle cavity 16 of the brewing cartridge adapter 10, and preferably includes a flange 17 for seating against the floor 14 of the brewing cartridge adapter 10, and barbs 19 for retaining the adapter extraction needle 18 in the brewing cartridge adapter 10. However, those skilled in the art will recognize various ways to retain the adapter extraction needle 18, for example, an interference fit, a threaded fit, adhesive, welding, and the like, and an adapter extraction needle 18 attached to the brewing cartridge adapter 10 using any method is intended to come within the scope of the present invention.

The adapter extraction needle 18 includes a shaft 30 with a point 31 to puncture the disposable brewing cartridge 40. Brewed beverage from the disposable brewing cartridge 40 enters the adapter extraction needle 18 through a mouth 32 and is released into brewing cartridge adapter 10 through the side passage 34. The adapter extraction needle 18 has an overall length L1 of about 0.9 inches and the shaft 30 has a length L2 of preferably about ⅝ inches. The flange 17 has a thickness T of preferably about 0.3 inches, and the side passage 34 has a length L3 of preferably about 0.15 inches.

Figure 7A:
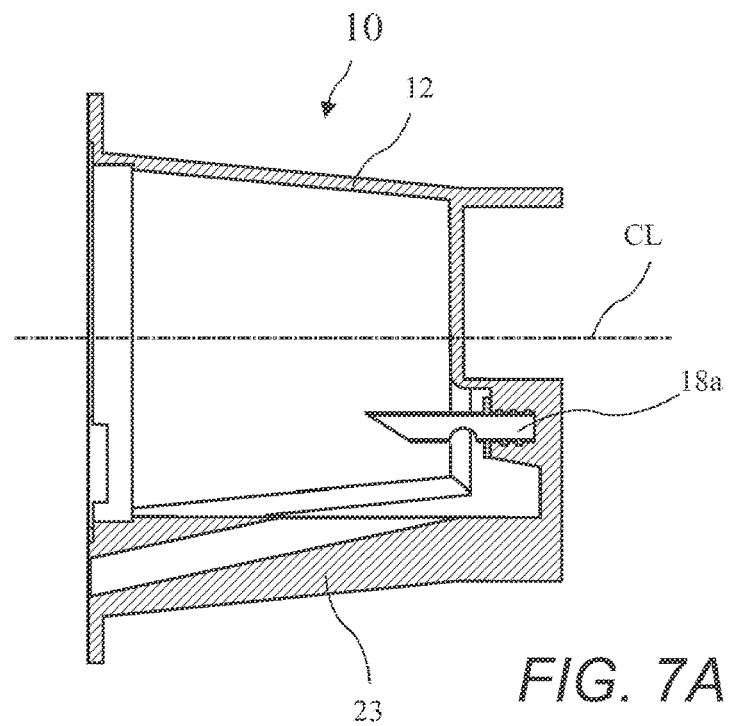
FIG. 7A shows a cross-sectional view of the brewing cartridge adapter having a first embodiment of the extraction needle according to the present invention taken along line 3-3 of FIG. 2.
Figure 7B:
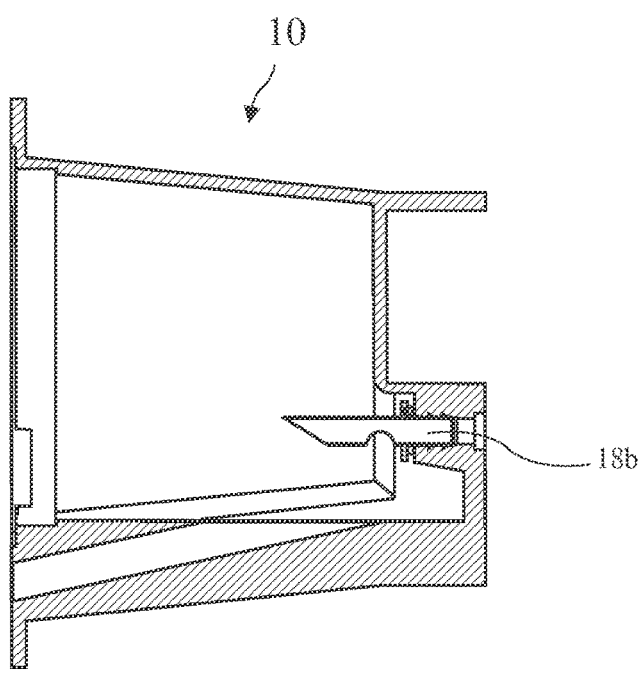
FIG. 7B shows a cross-sectional view of the brewing cartridge adapter having a second embodiment of the extraction needle according to the present invention taken along line 3-3 of FIG. 2.

A cross-sectional view of the brewing cartridge adapter 10 having a first embodiment of the extraction needle 18a taken along line 3-3 of FIG. 2 is shown in FIG. 7A, and a cross-sectional view of the brewing cartridge adapter having a second embodiment of the extraction needle 18b taken along line 3-3 of FIG. 2 is shown in FIG. 7B. The adapter extraction needle 18a is a threaded extraction needle held in the brewing cartridge adapter 10 by threads and the extraction needle 18b is a barbed extraction needle held in the brewing cartridge adapter 10 by barbs. Those skilled in that are will recognize that an adapter extraction needle may be attached to the brewing cartridge adapter 10 in various ways, and any reusable coffee holder according to the present invention having an adapter extraction needle attached to the brewing cartridge adapter 10 in any manner, is intended to come within the scope of the present invention.

The walls 12 are preferably frusto conical in shape, and generally radially symmetric about a centerline CL. A passage wall 23 enclosing the passage 20 reaches outside the walls 12.

Figure 8A:
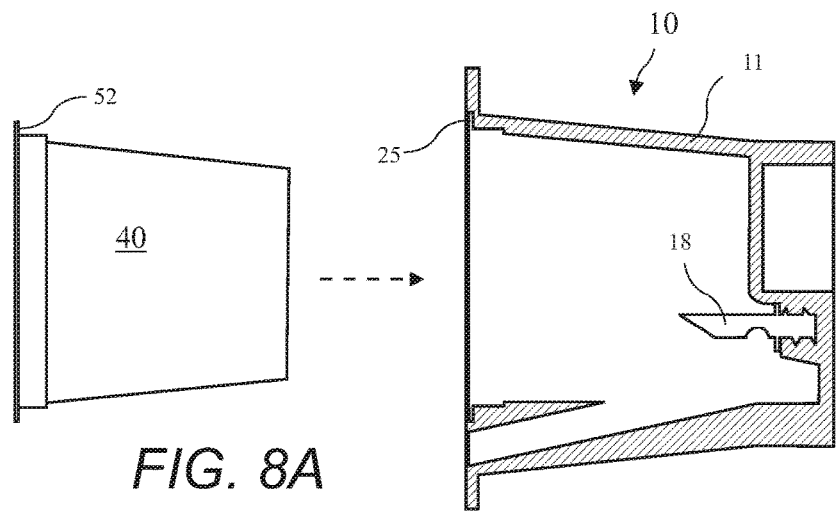
FIG. 8A shows a cross-sectional view of a disposable brewing cartridge for inserting into the cartridge adapter according to the present invention.
Figure 8B:
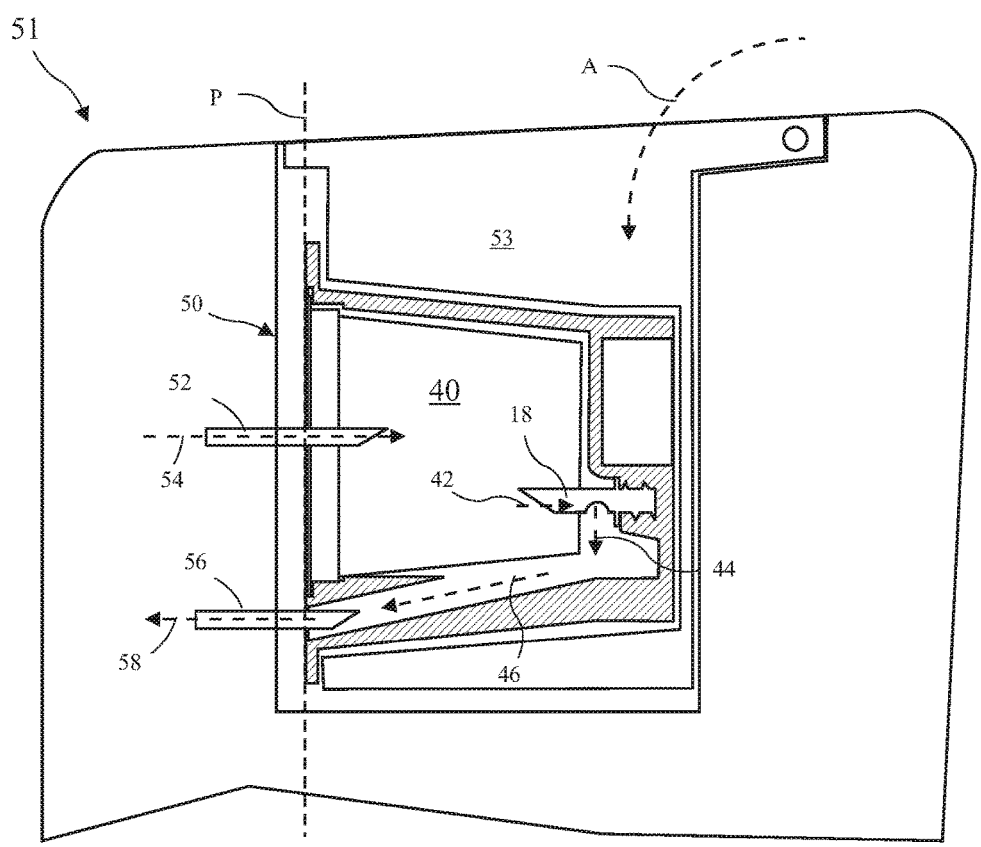
FIG. 8B shows a cross-sectional view of the disposable brewing cartridge in the cartridge adapter in a brewing chamber of a horizontal coffee maker according to the present invention.

A cross-sectional view of the disposable brewing cartridge 40 positioned for inserting into the cartridge adapter 10 is shown in FIG. 8A, and a cross-sectional view of the disposable brewing cartridge 10 in the cartridge adapter 10 in a horizontal brewing chamber 50 of a coffee maker 51 is shown in FIG. 8B. The disposable brewing cartridge 40 includes a rim 52. The rim 52 rests on the shelf 25 to position the disposable brewing cartridge 40 in the cartridge adapter 10. The brewing cartridge 40 is supported by a pivoting carrier 53 which is rotated about arc A to insert and remove the brewing cartridge 40 from the coffee maker 51.

An injection needle 52 of the coffee maker 51 passes through a plain P defined by the top of the of the brewing cartridge adapter 10 and pierces the top of the disposable brewing cartridge 40 and injects liquid 54 into the disposable brewing cartridge 40. The extraction needle 18 punctures the bottom of the cartridge 40 and brewed beverage 42 created in the disposable brewing cartridge 40 flows into the extraction needle 18. The brewed beverage 44 flows from the side passage 34 (see FIG. 6) into the cartridge adapter 10. The brewed beverage 46 then flows through the passage 20 to the top of the cartridge adapter 10 and out 58 through an extraction needle 56 of the coffee maker 51, also passing through the plain P.

Figure 10A:
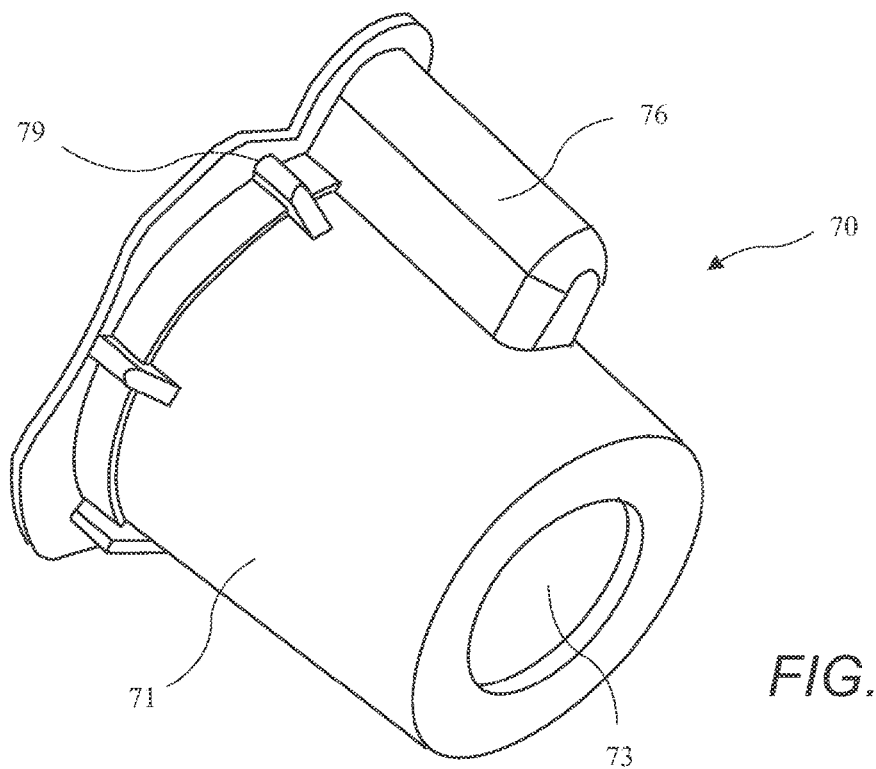
FIG. 10A shows a side and bottom perspective view of a holder base of the reusable coffee holder according to the present invention.
Figure 10B:
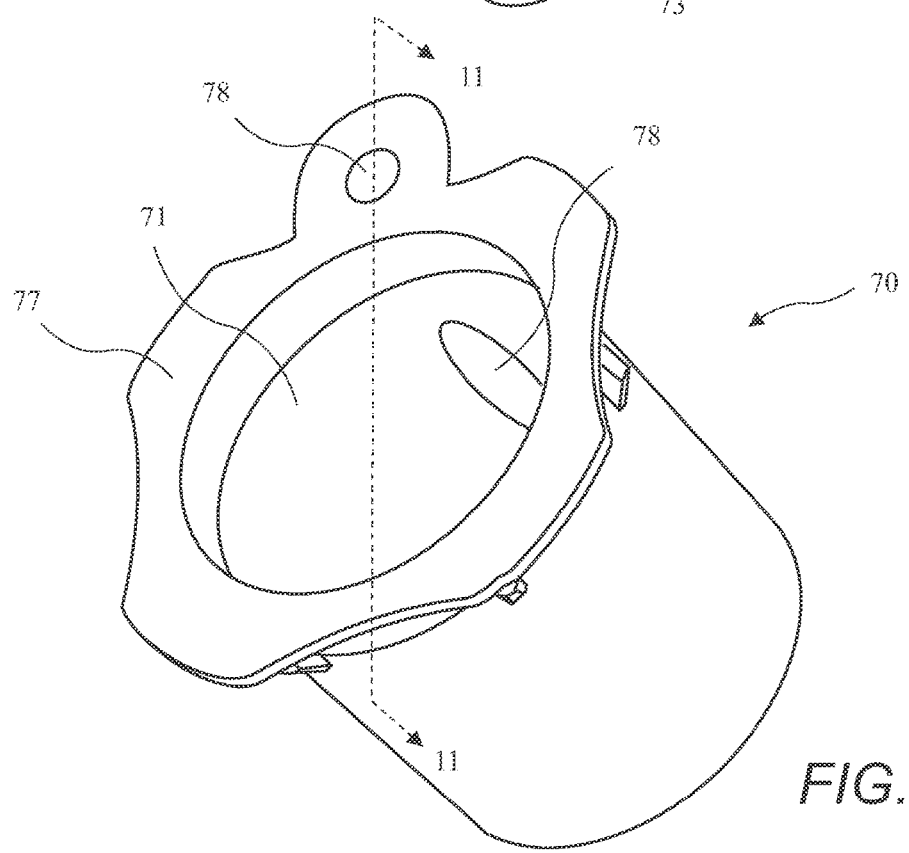
FIG. 10B shows a side and top perspective view of the holder base of the reusable coffee holder according to the present invention.

A perspective view of a reusable single serving brewing cartridge comprising a reusable coffee holder 60 according to the present invention is shown in FIG. 9, a side and bottom perspective view of a holder base 70 of the reusable coffee holder 60 is shown in FIG. 10A, a side and top perspective view of the holder base 70 of the reusable coffee holder 60 is shown in FIG. 10B, and a cross-sectional view of the reusable coffee holder according to the present invention taken along line 11-11 of FIG. 10B is shown in FIG. 11. The coffee holder 60 includes the base 70 and lid 80. The lid 80 includes a centered injection hole 82 and an offset extraction hole 84. An O-Ring 87 (see FIG. 12b) helps form a seal between the base 70 and the lid 80. A tam ping pad 72 resides inside the coffee holder 60 supported by a tamping spring 74.

The holder base 70 includes base walls 71 reaching from a floor 73 and an interior 70a defined by the floor 73 and walls 71, and an interior 75. A base lip 77 forms a close path at the top of the walls 71. The holder base 70 includes passage wall 76 forming an extraction passage 78 placing a holder base interior 80a in fluid communication with the offset extraction hole 84 in the holder lid 80, providing a path for brewed beverage to escape from the coffee holder 70 into a coffee maker. A clearance space 78a is defined overlapping the extraction passage 78 and extending into the holder base 70 providing clearance for a coffee maker extraction needle 56 (see FIG. 15). The bottom of the base 70 includes lower tamping spring retaining clips 79 for retaining the tamping spring 74 in the base 70.

A perspective top view of the holder lid 80 for the reusable coffee holder 60 is shown in FIG. 12A and a perspective bottom view of the holder lid 80 is shown in FIG. 12B. The holder lid extraction hole 84 is preferably at least 0.22 inches in diameter to provide clearance for the extraction needle 56 (see FIG. 15) of the coffee maker. The bottom of the lid 80 includes a lid lip 88 forming a closed path around a sealing ring 86 and resting against the base lip 77 in an assembled reusable coffee holder 60. The lid sealing ring 86 is a generally cylindrical ring and reaches down from the lid lip 88 into the interior 70a of the base 70, and preferably forms an interference fit to a top edge of the base walls 71. The lid sealing ring 88 preferably includes an O-Ring groove wherein resides an O-ring 87. In other embodiments, the lid may be attached to the base by cooperating threads on the lid and base, by one or more hooks reaching down from the lid or up from the base, and the like, and any reusable coffee holder according to the present invention having a mechanically attachable lid (i.e, not attached by an adhesive), which lid is detachable and re-attachable without repairing damage to the lid or altering the lid, is intended to come within the scope of the present invention. The lid 80 preferably is attached to the base 70 solely by features of the lid and base.

The lid 80 includes at least one alignment feature for aligning the lid 80 with the base 70. Examples of aligning features are a first lid alignment lip 88a around the offset extraction hole 84 and a second lid alignment lip 88b, preferably opposite to the first lid alignment lip 88a, project down from the lid lip 88 and cooperate with the base 70 to position the lid 80 on the base 70. The lid alignment lips 88a and 88b are spaced apart from the lid sealing ring 88 by at least the width of the base lip 77 allowing the lid lip 88 to rest against the base lip 77.

Figure 13A:
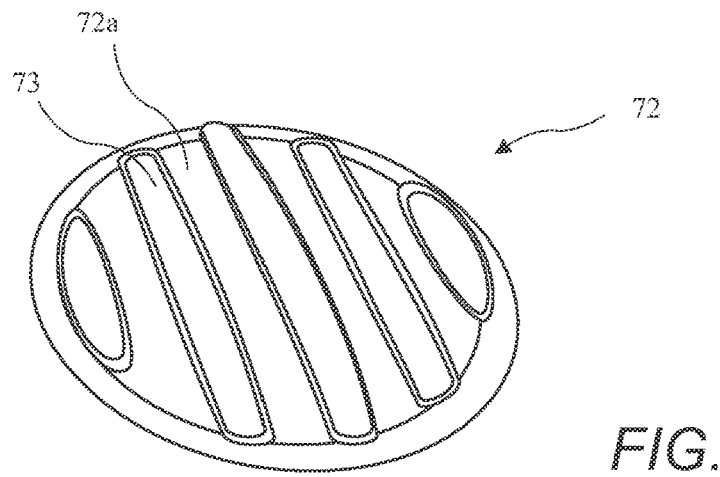
FIG. 13A is a top view of a tamping pad of the reusable coffee holder according to the present invention.
Figure 13B:
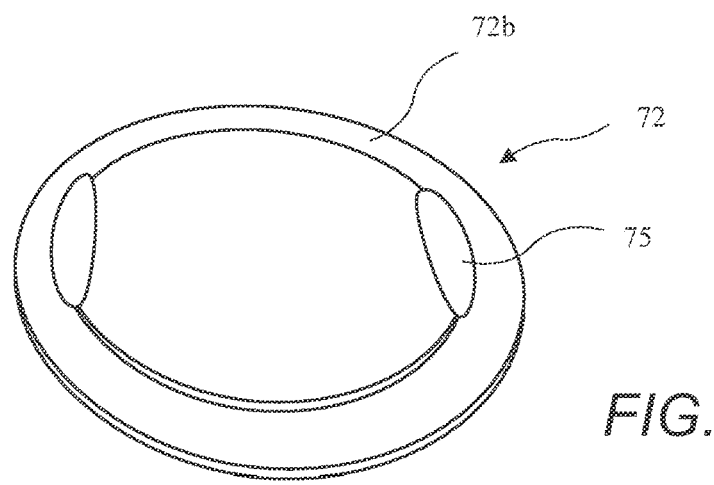
FIG. 13B is a bottom view of the tamping pad of the reusable coffee holder according to the present invention.
Figure 14:
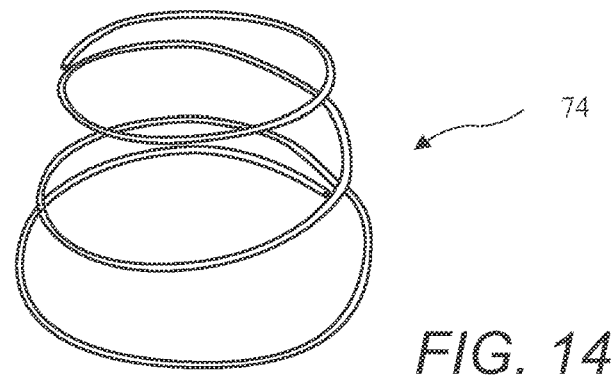
FIG. 14 shows a tamping spring of the reusable coffee holder according to the present invention.

A top view of the tamping pad 72 of the reusable coffee holder 60 is shown in FIG. 13A, a bottom view of the tamping pad 72 is shown in FIG. 13B, and the tamping spring 74 of the reusable coffee holder 60 is shown in FIG. 14. The tamping pad 72 preferably includes liquid flow ribs 73 on a top surface 72a to provide paths for brewed beverage, and upper tamping spring retention clips 75 on a bottom surface 72b to attach the tamping spring 74 to the tamping pad 72. The tamping spring 74 engages the lower tamping spring retention clips 79 (see FIG. 11) and the upper tam ping spring retention clips 75, to retain the tamping pad 72 in the base 70.

Figure 15:
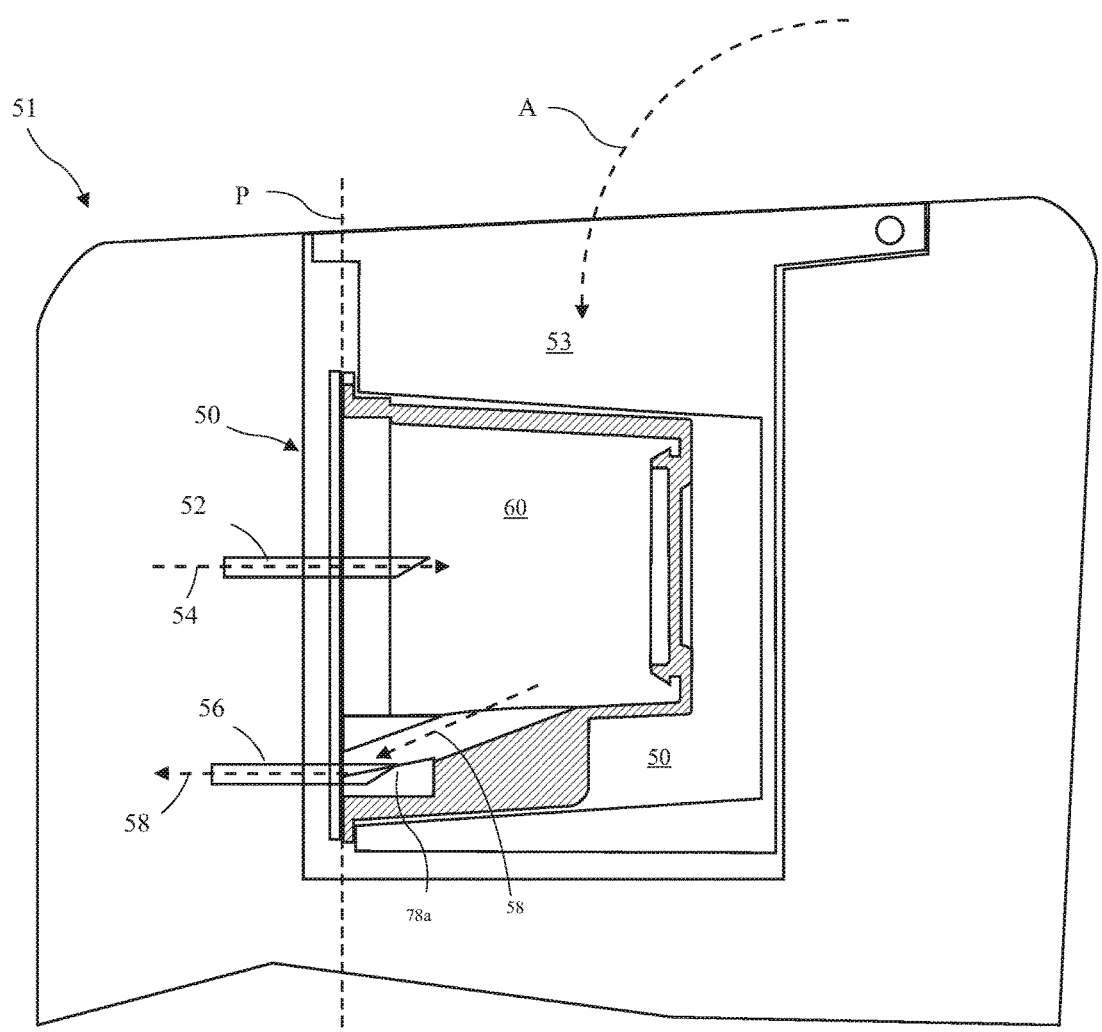
FIG. 15 shows the reusable coffee holder according to the present invention in a coffee maker.

The reusable coffee holder 60 is shown in the brewing chamber 50 of the coffee maker 51 in FIG. 15. The injection needle 52 passes through the plain P defined by the top of the of the holder base 70 and enters the reusable coffee holder 60 through the centered injection hole 82 and the extraction needle 56 enters the reusable coffee holder 60 through the offset extraction hole 84. The offset extraction hole 84 also passes through the plain P and reaches into the clearance space 78a to avoid contact or damage to the reusable coffee holder 60.

The brewing cartridge adapter 10 and the reusable coffee holder 60 are preferably made from plastic and are preferably reusable. The lid 80 may be a single use foil or similar material attached to the base 70 by adhesive, or may be a reusable plastic or similar material lid mechanically attachable and detachable to the base 70. The reusable lid including permanent openings for the coffee maker injection needle 52 and extraction needle 56.

While the invention herein disclosed has been described by means of specific embodiments and applications thereof, numerous modifications and variations could be made thereto by those skilled in the art without departing from the scope of the invention set forth in the claims.

I claim:

1. A reusable single serving brewing cartridge for use in a coffee maker, the brewing cartridge comprising:
   a base made from plastic and defining an interior and an exterior and comprising:
       a floor under the interior;
       walls reaching up from the floor and surrounding the interior; and
       a top edge of the walls above the interior;
   a passage wall outside the walls and forming an extraction passage, the passage wall closed at a bottom and reaching up to a permanently open outlet port proximal to the top edge of the walls;
   an entry port between the extraction passage and the interior, the extraction passage in fluid communication with the interior through the entry port allowing brewed drink to escape from the interior into the extraction passage, and in fluid communication with the coffee maker through the outlet port, and at least a portion of the extraction passage separated from the interior by the base walls at the top edge of the base walls; and
   a plane P defined by a top edge of the walls, the outlet port residing in the plane P, wherein the base is configured to allow an injection needle to come into fluid communication with the interior through the plane P for injection of liquid into the interior and into the brewing material, and to allow a coffee maker extraction needle to come into fluid communication with the interior through the plane P and through the permanently open outlet port to receive brewed drink from the interior through the extraction passage.

2. The reusable single serving brewing cartridge of claim 1, further including an adapter extraction needle residing in the floor of the base in fluid communication with the extraction passage, offset to a side, and pointing up and away from the floor the extraction needle including a side passage below the disposable cartridge placing an interior of the extraction needle in fluid communication with the extraction passage.

3. The reusable single serving brewing cartridge of claim 1, wherein the base is configured to receive a single use disposable brewing cartridge with a top diameter of about 1.8 inches, a height of about 1¾ inches, and a bottom diameter of about 1.45 inches.

4. The reusable single serving brewing cartridge of claim 1, wherein:
   the base includes a shelf at the wall top configured to support a rim of the disposable brewing cartridge; and
   the adapter extraction needle is configured to puncture the disposable brewing cartridge residing in the base.

5. The reusable single serving brewing cartridge of claim 1, wherein the walls are frustoconical in shape.

6. The reusable single serving brewing cartridge of claim 1, further including a lid, the attachable to the base and detachable from the base.

7. The reusable single serving brewing cartridge of claim 6, wherein the lid is disposable.

8. The reusable single serving brewing cartridge of claim 6, wherein the disposable lid is attached to the base by an adhesive.

9. The reusable single serving brewing cartridge of claim 6, wherein the lid is reusable.

10. The reusable single serving brewing cartridge of claim 9, wherein the reusable lid is attached to the base by mechanical cooperation of the lid and base.

11. The reusable single serving brewing cartridge of claim 10, wherein the mechanical cooperation of the lid and base comprises a cylindrical portion of the lid inserted into the base and pressing outward against the wall.

12. The reusable single serving brewing cartridge of claim 10, further including a cup made from filter paper and containing brewing material and having a rim, the rim captured between the lid and the base.

13. The reusable single serving brewing cartridge of claim 6, further including a tamping pad in the interior of the base and supported by a tamping spring connected to the base floor.

14. A reusable single serving brewing cartridge for use in a coffee maker, the brewing cartridge comprising:
   a base made from plastic and defining an interior and an exterior and comprising:
       a floor under the interior;
       walls reaching up from the floor and surrounding the interior; and
       a top edge of the walls above the interior, the top edge having a greater perimeter than the floor;
   a passage wall outside the walls, the passage wall closed at a bottom and reaching up to a permanently open outlet port proximal to the top edge of the walls;
   a passage between the passage wall and the interior, the passage in fluid communication with the interior allowing brewed drink to escape from the interior, and in fluid communication with the coffee maker through the outlet port;
   a plane P defined by a top edge of the walls, the outlet port residing in the plane P, wherein the base is configured to allow an injection needle to come into fluid communication with the interior through the plane P for injection of liquid into the interior and into the brewing material, and to allow a coffee maker extraction needle to come into fluid communication with the interior through the plane P and the outlet port to receive brewed drink from the interior through the passage;
   the base configured to receive a single use disposable brewing cartridge with a top diameter of about 1.8 inches, a height of about 1¾ inches, and a bottom diameter of about 1.45 inches; and
   an adapter extraction needle residing in the floor of the base in fluid communication with the passage, offset to a side, and pointing up way from the floor, the extraction needle including a side passage below the disposable cartridge placing an interior of the extraction needle in fluid communication with the passage.

15. A reusable single serving brewing cartridge for use in a coffee maker, the brewing cartridge comprising:
   a detached lid having a center permanent opening and an offset permanent opening;
   a base made from plastic and defining an interior having a generally round cross-section and an exterior and comprising:
       a floor under the interior;
       base walls having a generally round cross-section reaching up from the floor and surrounding the interior;

a top edge of the base walls above the interior;

a passage wall outside the generally round cross-section of the base walls forming an extraction passage, the passage wall closed at a bottom and reaching up to a permanently open outlet port of the base proximal to the top edge of the base walls, the outlet port aligned with the offset permanent opening in the lid when the lid is attached to the base and aligned with the permanently open in the outlet port, and at least a portion of the extraction passage separated from the interior by the base walls at the top edge of the base walls;

the extraction passage in fluid communication with the interior allowing brewed drink to escape from the interior into the extraction passage, and in fluid communication with the coffee maker through the outlet port and the offset permanent opening in the lid; and a plane P defined by the top edge of the base walls, the outlet port residing in the plane P, wherein the base is configured to allow an injection needle to come into fluid communication with the interior through the plane P for injection of liquid into the interior and into the brewing material, and to allow a coffee maker extraction needle to come into fluid communication with the interior through the plane P and the outlet port to receive brewed drink from the interior through the passage; and the lid is attached to the base by a full circle of overlapping mechanical cooperation of the lid and base.

16. The reusable single serving brewing cartridge of claim 1, further including an adapter extraction needle fixed to the floor of the base.

17. The reusable single serving brewing cartridge of claim 6, where in the lid includes alignment features for aligning a center permanent opening of the lid with the permanently open outlet port of the base.

18. The reusable single serving brewing cartridge of claim 15, further including a clearance space in the base, generally orthogonal to the top edge of the base walls and aligned with the outlet port, reaching down from the top edge of the base walls, and configured to provide clearance for a coffee maker extraction needle.

19. The reusable single serving brewing cartridge of claim 15, where in the lid includes alignment features for aligning the center permanent opening with the permanently open outlet port of the base.

* * * * *